(No Model.) 3 Sheets—Sheet 1.
A. W. J. BEST.
MOTOR VEHICLE.

No. 538,763. Patented May 7, 1895.

Inventor
Andrew W. J. Best

Witnesses
Jas. K. McCathran

By his Attorneys,
C A Snow & Co.

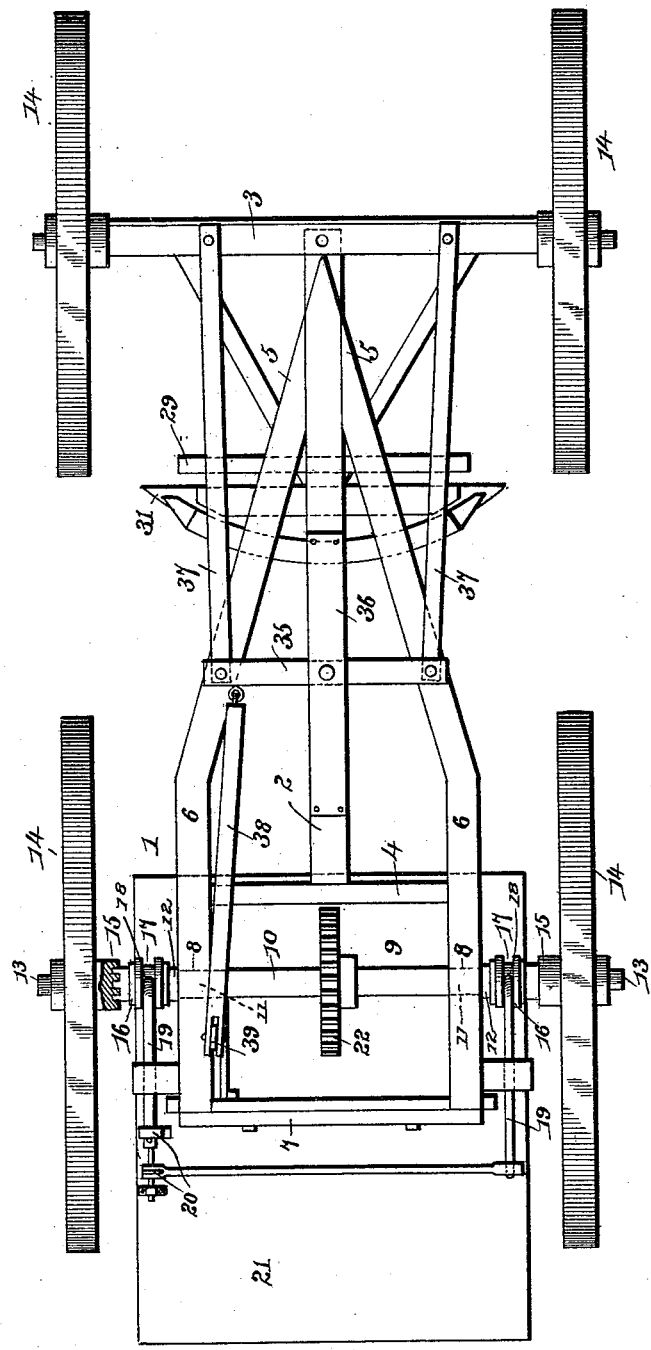

(No Model.) 3 Sheets—Sheet 3.

A. W. J. BEST.
MOTOR VEHICLE.

No. 538,763. Patented May 7, 1895.

Witnesses
Jas. K. McCathran
[signature]

Inventor
Andrew W. J. Best
By his Attorneys,
C. A. Snow & Co.

UNITED STATES PATENT OFFICE.

ANDREW W. J. BEST, OF KEY WEST, FLORIDA.

MOTOR-VEHICLE.

SPECIFICATION forming part of Letters Patent No. 538,763, dated May 7, 1895.

Application filed June 28, 1894. Serial No. 515,994. (No model.)

*To all whom it may concern:*

Be it known that I, ANDREW W. J. BEST, a citizen of the United States, residing at Key West, in the county of Monroe and State of Florida, have invented a new and useful Motor-Operated Vehicle, of which the following is a specification.

My invention relates to road wagons and similar vehicles, and particularly to vehicles adapted to be propelled by motors employing steam, electricity, or gas power; and the objects in view are to provide a simple, inexpensive, and efficient construction of running gear, whereby the vehicle may be readily operated without jarring or straining the structure, and whereby the same may be guided with facility by a rider stationed upon a platform supported by a rear truck of the vehicle.

Further objects and advantages of the invention will appear in the following description, and the novel features thereof will be particularly pointed out in the appended claims.

Figure 1:
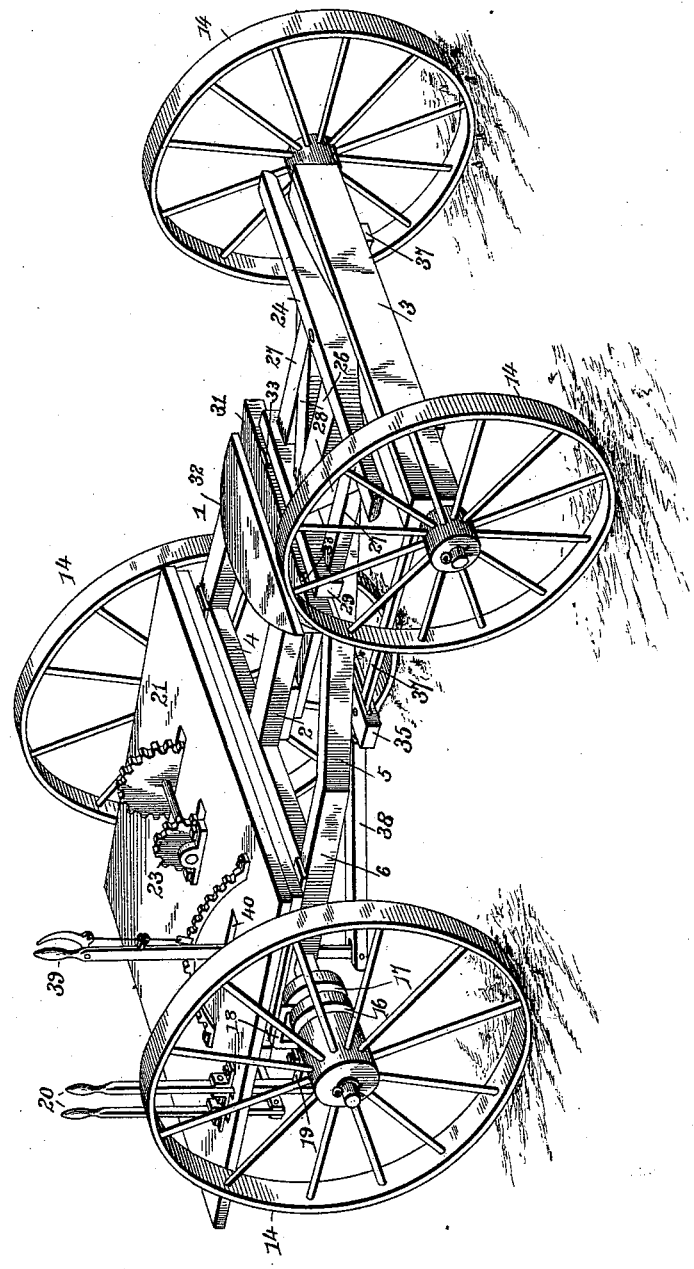
Figure 5:
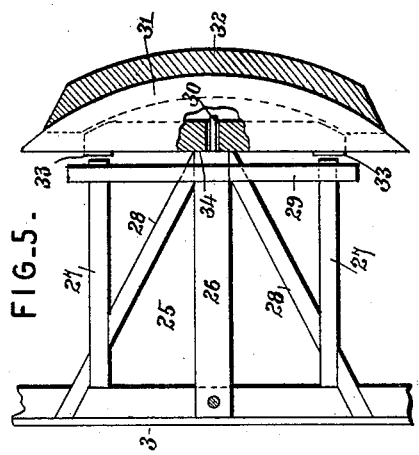
Figure 3:
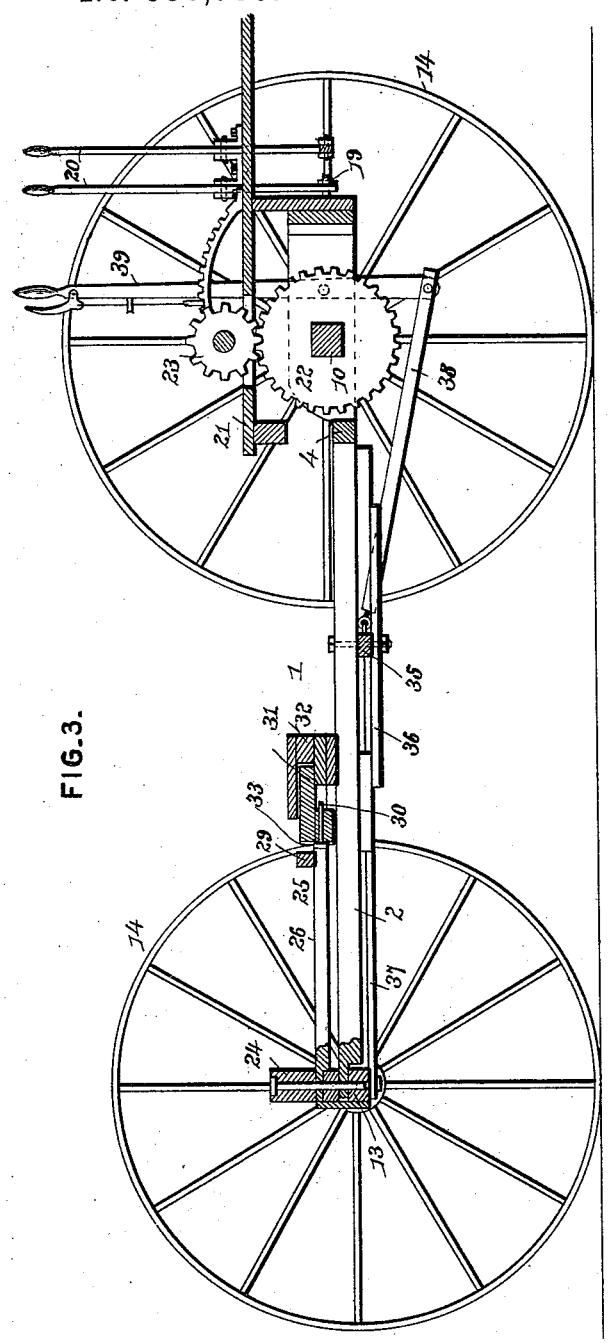
Figure 6:
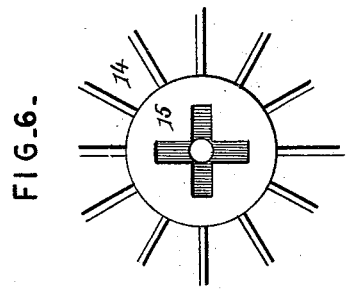
Figure 4:
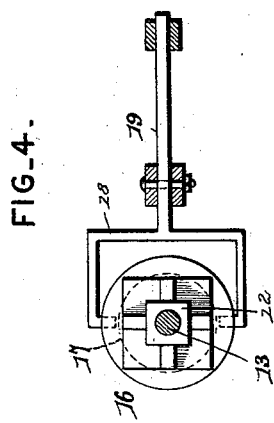

In the drawings, Figure 1 is a perspective view of a vehicle constructed in accordance with my invention. Fig. 2 is a bottom plan view of the same. Fig. 3 is a longitudinal section on the line 3 3 of Fig. 2. Fig. 4 is a detail view of one of the clutch devices for engagement with a driving or traction wheel. Fig. 5 is a detail view of the hood, the shoe operating therein, and the connected portions of the hounds. Fig. 6 is a detail view showing the inner end of the hub of one of the driving-wheels to show the clutch-face carried thereby.

Similar numbers of reference indicate corresponding parts in all the figures of the drawings.

1 designates a horizontal framework comprising a central reach 2, which is pivotally connected at its front end to the center of the front axle 3 and is rigidly attached at its rear end to a cross-bar 4, and rearwardly divergent side braces 5 attached at their front ends to the reach adjacent to its front extremity and attached at their rear ends to the parallel side bars 6 of the rear truck. These side bars 6 are connected near their front ends by the above described transverse bar 4 and at their rear ends by a transverse bar 7. In bearings 8 formed in said parallel side bars is the rear axle 9 having an intermediate angular portion 10, reduced rounded portions 11 mounted in said bearings, similar angular portions 12 which are disposed beyond the sides of the framework, and terminal rounded portions 13 upon which are mounted the driving or traction wheels 14. These driving or traction wheels are loosely mounted for independent rotation upon said rounded terminal portions of the rear axle, and their hubs are provided with clutch faces 15 for engagement with complementary faces of the clutch-members 16, which are slidably mounted upon the adjacent angular portions of the axle. These clutch members 16 are peripherally grooved, as shown at 17, for engagement by the yokes 18 of the pivotal levers 19 which are connected respectively to hand-levers 20 mounted in a platform 21, which is supported by the rear truck. By means of these levers either of the clutches may be thrown into or out of engagement with its respective wheel.

Fixed to the central or intermediate angular portion of the axle is a gear 22 which meshes with a suitable gear 23 supported by the framework and adapted to be operated by a motor, not shown, of any suitable or preferred construction.

The front axle 3 is preferably constructed of a plurality of pieces or parts united so as to break joint and form a rigid construction, and above the same and bearing thereon is a bolster-block 24, which is adapted to support the front end of a vehicle body, not shown. Attached to this front axle are the hounds 25 having the central longitudinally disposed bar 26, the parallel side bars 27, and the inclined braces 28 which converge toward their rear ends and are secured to the rear extremity of the central bar 26. Secured to the rear ends of said central and side bars 26 and 27 is a transverse connecting bar 29. The central bar 26 is extended in rear of the connecting bar 29, and is reduced to form a pintle 30 upon which is loosely swiveled a shoe 31, said shoe having a straight front side and a segmental rear side which are mounted slidably in a similarly shaped hood 32 secured in a transverse position to the upper surface of the main framework. The shoe is provided upon its front side with buffers or pillow-blocks 33 adapted to bear against the rear ends of the side bars 27 which extend slightly in rear of the rear side of the connecting-bar 29. The central portion of the shoe bears against a shoulder 34 at the junction of the reduced portion or pintle 30 with the main or body portion of the bar 26, and as the mounting of this shoe upon said pintle is loose, and as the shoe is capable of a slight vibration or rocking movement on the pintle as a center, it will be seen that either one, but not both, of the buffers or pillow-blocks may be brought into contact with the rear ends of the push-bars 27 according to the position of the front axle with relation to the main portion of the framework of the vehicle.

A steering-bar 35 is centrally pivoted to the under side of the reach between the same and a bracket 36 which is attached to said reach, and the extremities of this steering-bar are connected by means of links 37 with the front axle upon opposite sides of its central or pivotal point, and one arm of the said steering-bar is connected by means of a rod 38 with the lower end of a steering-lever 39 fulcrumed upon the main framework below the above described platform, said lever extending up through a slot 40 in the platform within reach of an operator stationed adjacent to the hand-levers by which the clutches are manipulated.

From the above description it will be seen that the forward impulse imparted by the motor and acting through the driving or traction wheels is conveyed to the main frame of the vehicle, and thence through the hood 32 and loose or swiveled shoe 31 to the push-bars which are carried by the hounds attached to the front axle, and as these push-bars are arranged at their front ends in contact with the front axle upon opposite sides of its center, and as the shoe shifts according to the position of the front axle to bear against the rear end of the push-bar which is attached to the rearmost end or portion of said front axle, the propulsion of the machine does not interfere with the accurate operation of the steering-mechanism. Therefore the vehicle may be readily steered from the rear platform, as above indicated, without difficulty and without danger of slipping or losing ground in turning corners.

In rounding curves with a vehicle of the class described, in which the power is applied from the rear, or by pushing the front or steering axle, there is a tendency to resist the forward movement of the wheel on the inside of the curve, both from the fact that the inner wheel carries the major portion of the weight, and is that wheel toward which the turn is made. Therefore, if motion is communicated to the front axle through a single central push-bar, difficulty would be experienced in properly steering or directing the movement of the vehicle. To obviate this difficulty I employ the side push-bars 27, which are not brought into use except when the vehicle is rounding a curve. When the vehicle is turned to the right, thus throwing the right-hand steering-wheel in rear of the left-hand wheel, the right-hand push-bar, which bears against the axle to the right of its center, is brought into use, thus transferring the forward pressure to a point nearer the wheel which offers the greater resistance.

By the above arrangement of parts the forward motion of the vehicle is communicated to the steering axle solely by means of the hood 32 and shoe 31 and the swinging-frame 25 which carries said shoe, and by the pivotal arrangement of the shoe the point of application of the forward pressure is transferred from the center to either side of the center of the front or steering axle, to suit the position of such steering axle, or the direction of movement of the vehicle.

It will be understood that in practice various changes in the form, proportion, and the minor details of construction may be resorted to without departing from the spirit of the invention or sacrificing any of the advantages thereof.

Having described my invention, what I claim is—

1. In a vehicle of the class described, the combination with a main framework, rear traction wheels, a front axle pivotally connected to the framework, and means for turning said front axle to guide the vehicle, of push-bars attached at their front ends to the front axle upon opposite sides of its center, a hood rigidly attached to the main framework, and a shoe loosely swiveled at its center to the front hounds operating in said hood and adapted to bear at either end against the rear extremities of said push-bars, substantially as specified.

2. In a vehicle of the class described, the combination with a framework, rear driving or traction wheels, a front axle pivotally connected to the framework, means for turning said front axle to guide the vehicle, and hounds extending from the front axle and provided with a central longitudinally disposed bar, of push-bars arranged upon opposite sides of said central bar and bearing at their front ends against the front axle, a hood fixed to said framework, and a shoe swiveled upon the rear extremity of said central bar and provided at its extremities with buffer or pillow-blocks to bear against the rear extremities of the push-bars, substantially as specified.

3. In a vehicle of the class described, the combination of a supporting framework having a central longitudinal reach, parallel side bars connected by cross-bars 4 and 7, said reach being attached at its rear end to the cross-bar 4, rearwardly divergent braces attached at their front ends to the reach and at their rear ends to the side bars of the framework, a segmental hood attached to the upper side of the reach, a front axle pivotally connected to the front end of the reach and carrying steering-wheels, push-bars attached at their front ends to the front axle at opposite sides of its pivot point, a central bar 26 arranged between and parallel with said push-bars and terminating at its rear end in a reduced pintle, a shoe swiveled upon said pintle and adapted to bear at either end against the rear extremities of said push-bars, said shoe being provided with a rear segmental side to fit and operate in the segmental hood, a steering-bar pivotally connected to the reach and loosely connected at its extremities by interposed links with the front axle, a steering-lever operatively connected with said steering-bar, a rear driving-axle loosely mounted in the frame work, means for communicating motion to said rear axle, driving or traction wheels loosely mounted upon said rear axle, and clutch-devices for securing the driving or traction wheels to the axle, substantially as specified.

In testimony that I claim the foregoing as my own I have hereto affixed my signature in the presence of two witnesses.

ANDREW W. J. BEST.

Witnesses:
W. H. PARKER,
HENRY HICE.